(12) United States Patent
Hayes et al.

(10) Patent No.: US 8,258,412 B2
(45) Date of Patent: Sep. 4, 2012

(54) SWITCHABLE ELECTRICAL POWER SYSTEM

(75) Inventors: Daniel L. Hayes, Kendallville, IN (US); Sean M. Kirkwood, Auburn, IN (US)

(73) Assignee: Group Dekko, Inc., Kendallville, IN (US)

( * ) Notice: Subject to any disclaimer, the term of this patent is extended or adjusted under 35 U.S.C. 154(b) by 513 days.

(21) Appl. No.: 12/608,716

(22) Filed: Oct. 29, 2009

(65) Prior Publication Data
US 2011/0100702 A1    May 5, 2011

(51) Int. Cl.
*H02B 1/015* (2006.01)

(52) U.S. Cl. ....... 174/500; 174/480; 174/495; 174/68.1; 439/215; 439/216; 439/120; 52/220.1

(58) Field of Classification Search ............ 174/480, 174/481, 68.1, 68.3, 541, 500, 495; 439/215, 439/216, 212, 210, 119, 120, 121; 52/220.1, 52/220.3, 220.7; 361/600, 601, 679.01
See application file for complete search history.

(56) References Cited

U.S. PATENT DOCUMENTS

| | | | |
|---|---|---|---|
| 4,060,294 A | 11/1977 | Haworth et al. | |
| 4,367,370 A | 1/1983 | Wilson et al. | |
| 4,781,609 A | 11/1988 | Wilson et al. | |
| 5,236,370 A | 8/1993 | King et al. | |
| 5,336,097 A * | 8/1994 | Williamson et al. | 439/215 |
| 5,595,495 A | 1/1997 | Johnson et al. | |
| 6,491,535 B1 * | 12/2002 | Buse | 439/215 |
| 6,575,777 B2 * | 6/2003 | Henriott et al. | 439/215 |
| 7,614,896 B2 * | 11/2009 | Johnson et al. | 439/215 |
| 7,651,353 B2 * | 1/2010 | Laukhuf | 439/215 |
| 7,697,268 B2 * | 4/2010 | Johnson et al. | 361/601 |
| 7,926,231 B2 * | 4/2011 | Laukhuf | 52/220.1 |

* cited by examiner

*Primary Examiner* — Angel R Estrada
(74) *Attorney, Agent, or Firm* — Taylor IP, P.C.

(57) ABSTRACT

A furniture system including at least one furniture element having at least one raceway and a modular electrical wiring system at least partially located in the raceway. The electrical wiring system includes a plurality of wire distribution assemblies, an electrical assembly and an electrical switch. The plurality of wire distribution assemblies includes a first wire distribution assembly and a second wire distribution assembly. The electrical assembly partially electrically connects the first wire distribution assembly and the second wire distribution assembly. The first wire distribution assembly has a first number of electrical conductors. The electrical assembly is electrically connected to a second number of electrical conductors of the first wire distribution assembly, the second number being smaller than the first number. The electrical switch is configured to electrically connect a first electrical conductor of the first wire distribution assembly that is a member of the second number of electrical conductors to a second electrical conductor of said first wire distribution assembly that is a member of the first number of electrical conductors and not a member of the second number of electrical conductors.

20 Claims, 6 Drawing Sheets

SWITCHABLE ELECTRICAL POWER SYSTEM

BACKGROUND OF THE INVENTION

1. Field of the Invention

The present invention relates to an electrical power distribution system, and, more particularly, to an electrical power distribution system utilized in modular wall panel systems.

2. Description of the Related Art

Open and flexible office systems utilize modular wall panels for establishing temporary efficient office space without the need to reestablish overhead lighting and environmental heating and cooling in an office area. Modular wall panels incorporate electrical wiring for the efficient organization of electrical power distribution within the office. The electrical distribution is handled with distribution assemblies that allow electrical receptacles to be interconnected for the distribution of electrical power thereto. Wiring distribution units are often jumpered together with jumper cables for the further distribution of electrical power. Power enters the modular wiring system by way of a power entry unit that provides electrical power to the wire distribution units.

Rooms are often wired with electrical wall switches that allow the switching of receptacles for the controllable application of electrical power to the outlets, which may be connected to lamps or other devices.

Modular wiring distribution systems typically include a multitude of electrical conductors that carry electrical power, serve as ground conductors, and return or neutral conductors. A typical legacy system includes a ten wire distribution system, which has six of the conductors providing power, two conductors providing safety ground, and two conductors serving as neutral or return conductors. A selected subset of the conductor lines are utilized to power receptacles in the modular wall panel.

What is needed in the art is an apparatus and a method to utilize legacy wire distribution systems and to introduce wiring flexibility thereto.

SUMMARY OF THE INVENTION

The present invention provides an electrical wiring system for the introduction of switched conductors to legacy wire distribution assemblies.

The invention consists, in one form thereof, a furniture system including at least one furniture element having at least one raceway and a modular electrical wiring system at least partially located in the raceway. The electrical wiring system includes a plurality of wire distribution assemblies, an electrical assembly and an electrical switch. The plurality of wire distribution assemblies includes a first wire distribution assembly and a second wire distribution assembly. The electrical assembly partially electrically connects the first wire distribution assembly and the second wire distribution assembly. The first wire distribution assembly has a first number of electrical conductors. The electrical assembly is electrically connected to a second number of electrical conductors of the first wire distribution assembly, the second number being smaller than the first number. The electrical switch is configured to electrically connect a first electrical conductor of the first wire distribution assembly that is a member of the second number of electrical conductors to a second electrical conductor of said first wire distribution assembly that is a member of the first number of electrical conductors and not a member of the second number of electrical conductors.

An advantage of the present connection is that a legacy wire distribution assembly can be utilized to provide switched power to a modular office.

Another advantage of the present invention is that dedicated circuits within a manufactured wiring system can be disabled and reassigned to provide power that is controlled by an electrical or mechanical switching method.

Yet another advantage of the present invention is that it allows the sharing of power from an active circuit to a non-active, isolated circuit thereby providing power control.

Yet another advantage of the present invention that it allows the use of jumpers or connector assemblies that have a reduced circuit capacity thereby allowing the isolating of power from one point to another point in the wiring distribution system.

A further advantage of the present invention is that a wiring distribution harness or assembly can be configured mechanically or electrically to provides power isolation for the use of controlling power to the circuit of choice.

A yet further advantage of the present invention is that a controller or power switching device can be modularly connected to a manufactured wiring system for controlling power therein.

A yet further advantage of the present invention is that a device can control one or more separate circuits.

Still yet a further advantage of the present invention is that it can use a sensing device that is used to determine if a designated area is occupied or unoccupied.

Yet still further, another advantage of the present invention is that push modules can be attached to a controller system that uses ultrasonic, thermal, pressure, optical sensing, RFID, RF, or magnetic sensing inputs to detect occupancy or lighting changes in a designated area.

Yet still further advantage of the present invention is that newly installed or previously installed modular systems can be retrofitted to provide for switching circuits therein.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
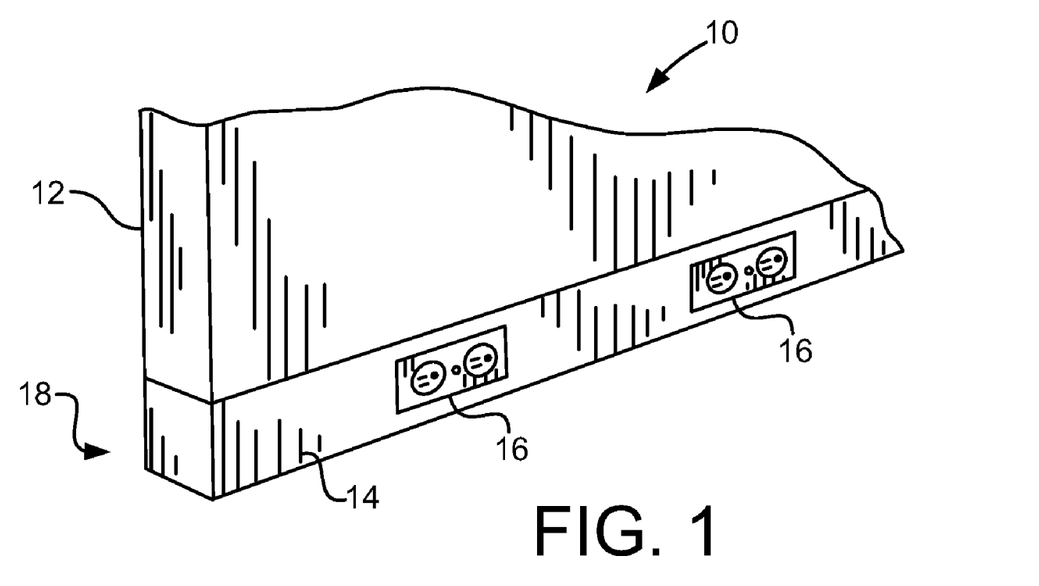
FIG. 1 is a perspective view of an embodiment of a furniture system in the form of a wall panel with electrical receptacles positioned in a raceway utilizing an embodiment of the present invention.

Referring now to the drawings, and more particularly to FIG. 1, there is shown a modular office system 10 including a furniture element 12, a raceway 14, an electrical receptacle 16, and a power distribution system 18 contained therein. Modular office system 10 is utilized in an open office space as partitioning walls. Furniture element 12 may be in the form of multiple wall panels 12 that are utilized to form individual office spaces and often are utilized on more than one side to define office spaces. Although furniture element 12 is depicted as a wall panel 12 in FIG. 1, any office furniture element with a raceway 14, such as a desk, wall panel, printer stand or other furniture piece is included in the description of furniture element 12. Electrical power distribution system 18 can also be referred to as a modular electrical system for use in an office environment.

Figure 2:
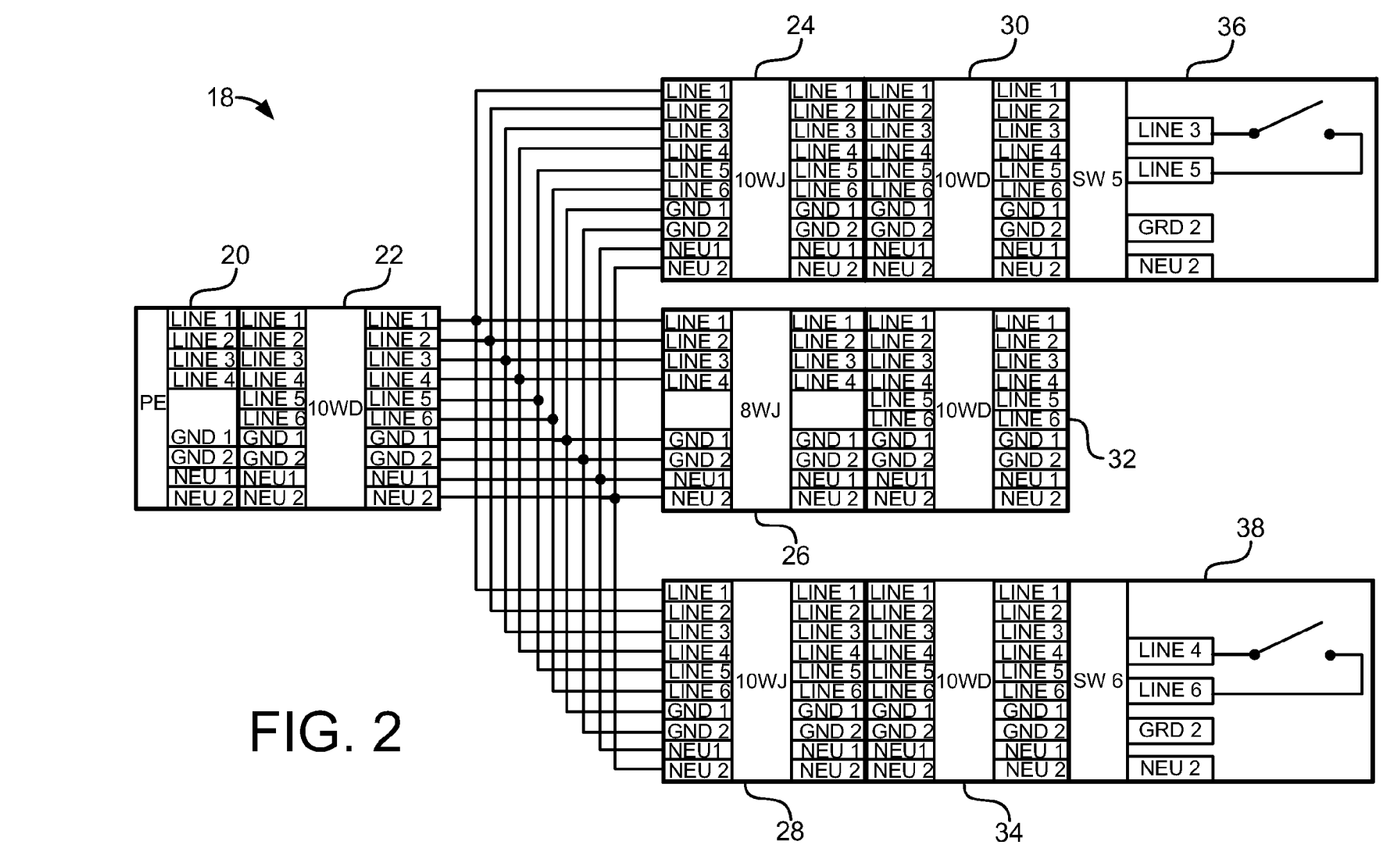
FIG. 2 is a schematical view of an embodiment of an 8-10 switchable power system of the present invention.

Now, additionally referring to FIG. 2, there is shown an 8-10 electrical power distribution system of the present invention. Power system 18 includes a power entry unit 20, a 10-wire distribution assembly 22, a 10-wire jumper device 24, an 8-wire jumper device 26, a 10-wire jumper assembly 28, 10-wire distribution assemblies 30, 32 and 34, and switches 36 and 38. Power entry unit 20, in this embodiment, has an 8-line connector with four electrical power lines, two ground lines, and two neutral lines. Power lines 1-4 may include voltages of different phases. Connected to power entry 20 is a 10-wire distribution assembly 22 which may be significantly similar to devices 30, 32 and 34. Electrical receptacles may be connected to 10-wire distribution units 22, 30, 32 and 34 between one of the active lines 1, 2, 3 or 4 and utilize neutrals 1 or 2 in the distribution of power. Electrical power in lines 1-4 is unswitched and is supplied throughout power system 18. Jumper 24, distribution assembly 30, and switch 36 may be physically part of one or more associated wall panels defining an office area. Switch 36 shown as SW5 within indicating that power is switched to line 5 utilizes electrical power from line 3 to be switched onto line 5. Switch 36 thereby provides switchable power along line 5 throughout wire distribution units 22, 30 and 34.

Switch 36 as well as the other switches are understood to include relays, electronic switches, manually initiated switches, such as a wall switch and other electrical switching mechanisms.

In a similar manner, jumper 28, distribution assembly 34, and switch 38 switches power from line 4 to line 6 thereby providing switchable electrical power to line 6 in wire distribution assemblies 22, and 34. The switchable power in these wire distribution units occurs because power entry 20 did not assign any power to lines 5 or 6. Power entry unit 20 may be a 10-line unit having an 8-wire jumper, such as jumper 26 positioned between power entry 20 and distribution assembly 22. The jumpers referred to herein are electrical assemblies that pass electrical power from one power distribution assembly to another distribution assembly, or from a power entry unit to a distribution assembly.

8-wire jumper 26 is connected to and provides power to 10-wire distribution assembly 32. Since jumper 26 is open on lines 5 and 6, then the switchable power that is available in the rest of system 18 is not switched onto lines 5 and 6 of distribution assembly 32. This advantageously allows lines 5 and 6 to be separately assigned at a future date, perhaps by one or more switch units similar to switches 36 and 38, but are not shown. Except for lines 5 and 6, the rest of the electrical conductors in wiring distribution assembly 32 are electrically connected to the rest of system 18.

Figure 3:
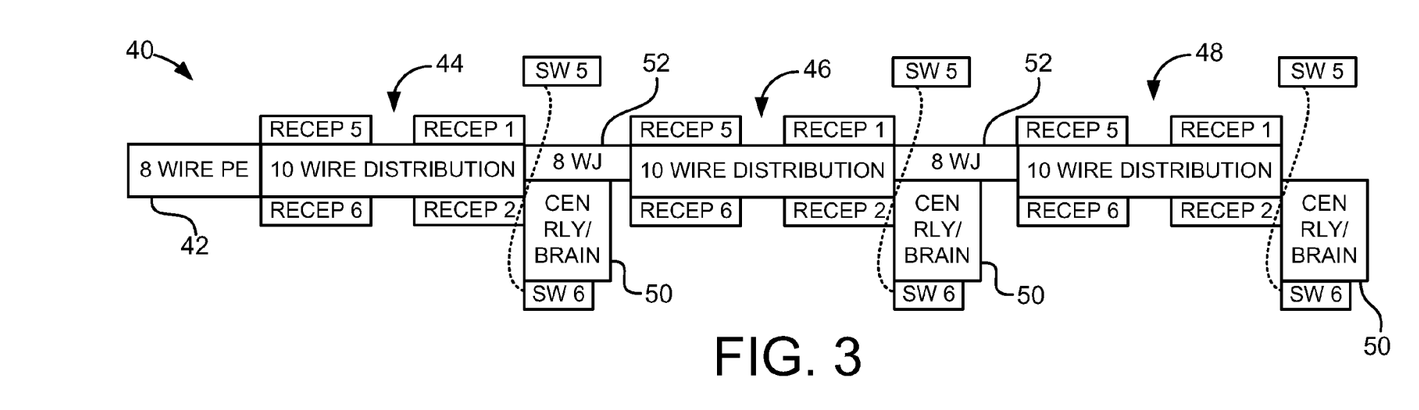
FIG. 3 is a block diagram of a modular furniture system utilizing the 8-10 switchable power system of the present invention.
Figure 4:
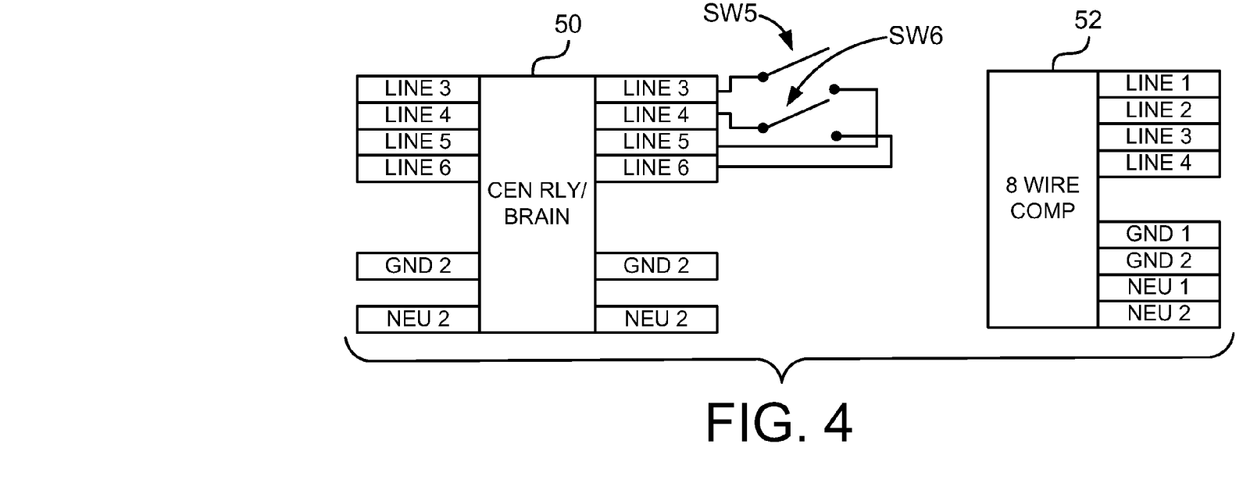
FIG. 4 illustrates in a schematic form a central relay/brain and an 8-wire component utilized in the wiring distribution system of FIG. 3.

Now, additionally referring to FIGS. 3 and 4, there is shown a multistation modular wall panel electrical distribution system 40. The 8-10 power system 40 is another embodiment utilizing the techniques illustrated in FIG. 2. An 8-wire power entry 42 provides power to stations 44, 46, and 48. Stations 44, 46, and 48 can be understood to each represent two office units, one on each side of the horizontal flow of FIG. 3. For example, station 44 may have a receptacle 1 and a receptacle 5 on one side of a modular wall panel and a receptacle 2 and a receptacle 6 on an opposite side. In a modular wall panel, which may extend perpendicularly from the horizontal flow illustrated, that serves to separate receptacle 1 and receptacle 2 on opposite sides, with a switch 5 and a switch 6 connected therein. A central relay/brain 50 determines when lines 5 and 6, which are respectively connected to receptacles 5 and 6 should be energized or deenergized. Although switches SW5 and SW6 are illustrated as separate single throw, single pole switches, they may be activated by a sensor system, and may be part of central relay/brain 50. Sensors determine whether the area immediately adjacent thereto is occupied or unoccupied and then, based on a timing algorithm or other sensory inputs, may selectively deenergize lines 5 and/or 6 of station 44. The sensors may utilize ultrasonic, thermal, pressure, optical, RFID, infrared, RF, or magnetic inputs to detect occupancy in the adjacent modular office. Additionally, the overall lighting in the room may be detected and affect the decision as to whether to activate or deactivate receptacles 5 and/or 6. This is repeated along system 40, with stations 46 and 48 each having a switch 5 on one side and a switch 6 on the opposite side to allow the control of the receptacle in each of the schematically shown office areas. 8-wire jumpers 52, or an 8-wire component 52, which may be similar to 8-wire jumper 26 is interconnected between 10-wire distribution assemblies in stations 44, 46, and 48 which is SW5 and SW6 in each modular office to have a switched line therein. Advantageously, the present invention allows for reconfiguration of legacy 10-wire distribution systems so that switching mechanisms, based upon the above mentioned or other sensing techniques, can be used to decrease the power usage in the office environment.

The switched receptacles may have connected thereto items that do not have to be powered when the occupant is not in that area. For example, receptacle 6 may have the monitor of a computer, the speaker system, an office light, a battery charger for a mobile phone or walkie-talkie or other items that can be switched off when the office is unoccupied. In that manner, electrical power which may be consumed by unused items, and even transformer systems that are plugged thereinto having a quiescent current draw, can be eliminated from the power system thereby eliminating unneeded electrical power usage in an efficient manner.

Figure 5:
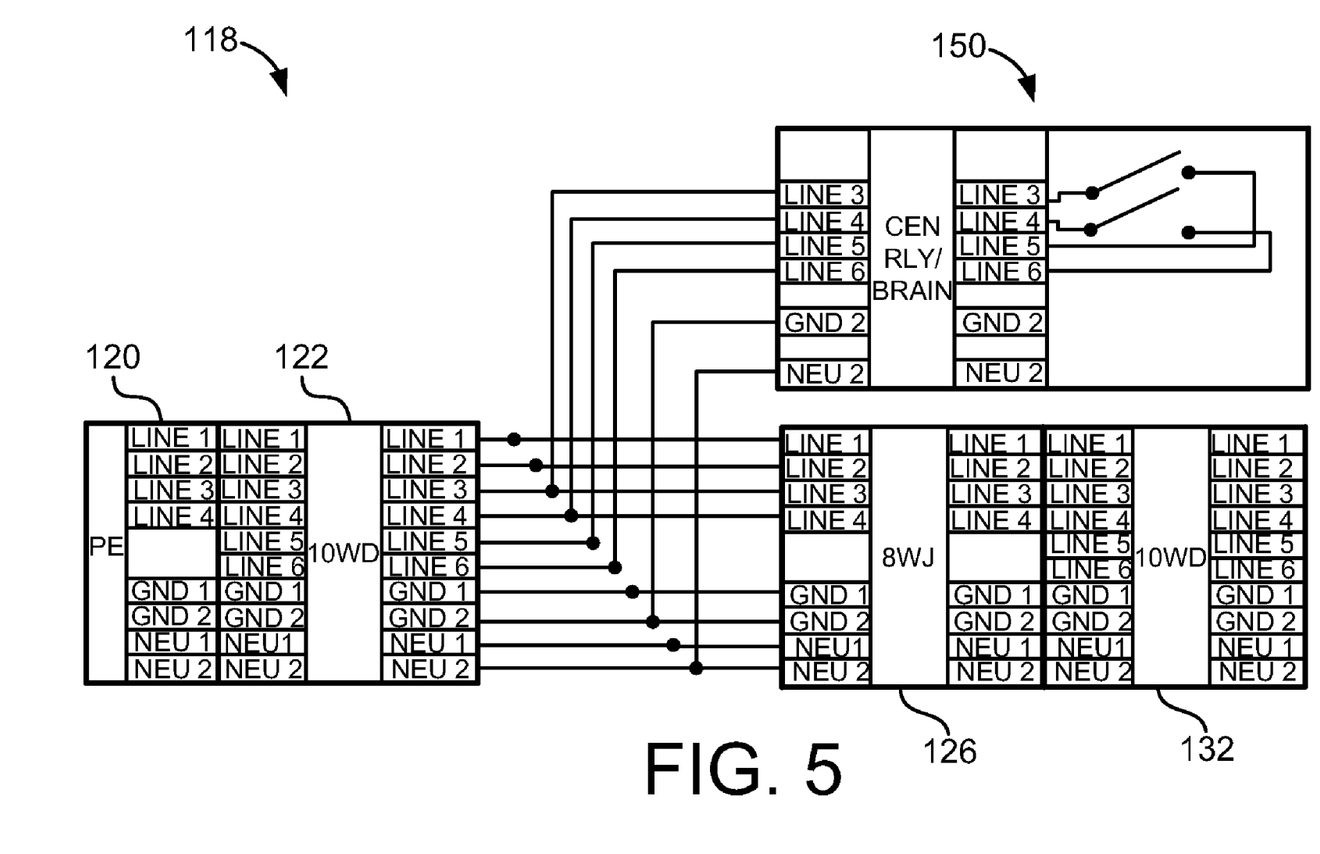
FIG. 5 is a schematical representation of another embodiment of an 8-10 switchable power distribution system of the present invention.

Now, additionally referring to FIG. 5, there is shown in schematic form, another embodiment of an 8-10 power system of the present invention. Element numbers herein are similar to those described above yet have 100 added thereto. Power system 118 includes a power entry unit 120, a 10-wire distribution assembly 122, a central relay/brain 150, an 8-wire jumper 126, and a 10-wire distribution assembly 132. As connected in system 118, power entry 120 provides eight lines of electrical connection again leaving lines 5 and 6 unconnected in 10-wire distribution assembly 122. Switches in unit 150 are configured to electrically provide power to lines 5 and 6 in 10-wire distribution assembly 122 when selected yet lines 5 and 6 in 10-wire distribution assembly 132 remain unaffected because the switching is not passed through 8-wire jumper 126.

Figure 6:
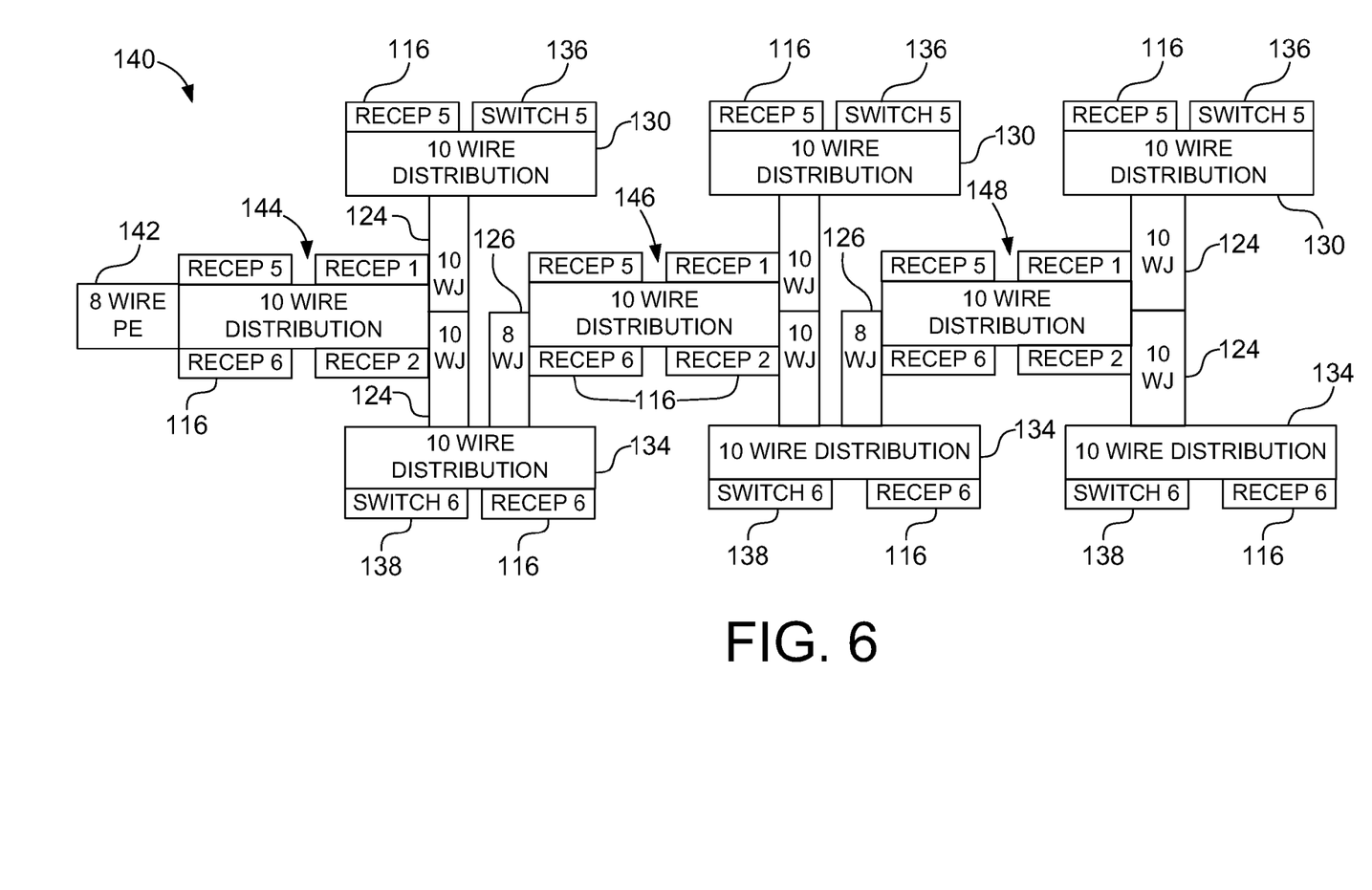
FIG. 6 is a block diagram representing another embodiment of a modular furniture system incorporating the wiring distribution system of the present invention.
Figure 7:
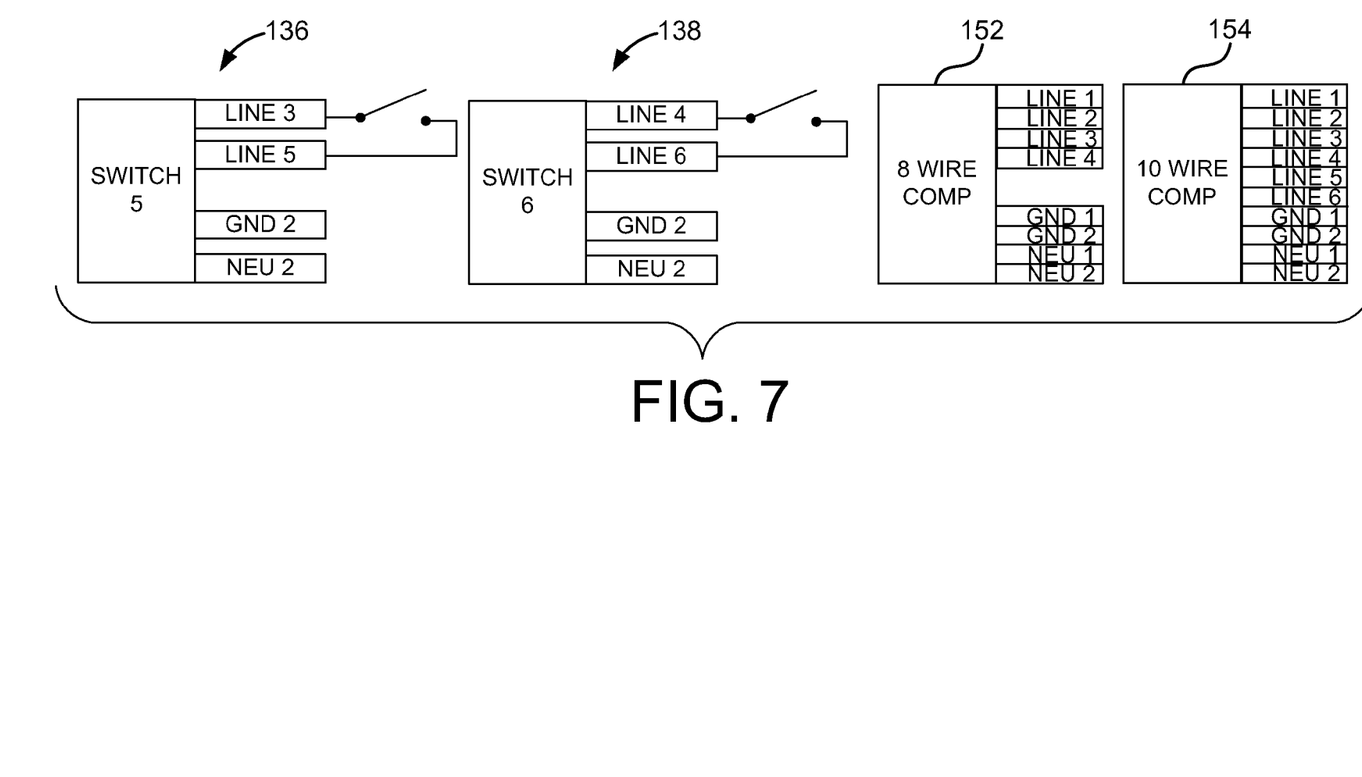
FIG. 7 illustrates switches and an 8-wire component and a 10-wire component which may be incorporated into the electrical distribution system of FIG. 6.

Now, additionally referring to FIGS. 6 and 7, there is illustrated another embodiment of an 8-10 power distribution system 140, again having 100 added to elements previously described. An 8-wire power entry unit 142 provides power to 10-wire distribution system of station 144 having receptacles 1, 2, 5 and 6 connected thereto. Receptacles 1 and 2 are powered respectively from lines 1 and 2 and provide electrical power on a continuous basis to the modular areas connected therewith. 10-wire jumpers 124 connect to 10-wire distribution assemblies 130 and 134 from 10-wire distribution assembly directly connected to 8-wire power entry 142. Since 10 wires are all connected to 10-wire distribution assemblies 130 and 134, switch 6 in assembly 138 allows for the switching of power to control both the receptacle 6 connected to distribution assembly 134 as well as the receptacle 6 connected to the initial 10-wire distribution assembly. Switch 5 is associated with 10-wire distribution unit 130. Likewise, switches receptacles 5 are connected thereto as well as to the initial 10-wire distribution assembly. Station 146 and 148 are substantially similar and are, respectively, connected to 10-wire distribution assemblies 134 by way of 8-wire jumpers 126, thereby allowing two additional switched lines in each station 146 and 148 respectively. 8-wire component 152 and a 10-wire component 154 may be utilized therein and are used to schematically illustrate that lines 5 and 6 are missing from 8-wire component 152 but are present in 10-wire component 154.

Advantageously, the present invention allows the jumper to have a subset of conductors passing on fewer than the number of electrical conductors in a wire distribution assembly thereby allowing switched lines in a modular level throughout the wiring system. In the 10-wire legacy system, it has been selected that there would be four conductors which supply power and remain constantly activated while in each set, 2 wires, which can be thought of as a subset of the total number of conductors, are switchable in each wire distribution assembly. The electrical switching capability of central relay/brain 50 advantageously reduces or eliminates the "vampire power" which is understood to mean the electrical power drained by unneeded electrical components attached thereto.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A furniture system with a modular electrical distribution system, comprising:
   at least one furniture element having at least one raceway;
   a modular electrical wiring system at least partially located in said raceway, the electrical wiring system including:
      a plurality of wire distribution assemblies including a first wire distribution assembly and a second wire distribution assembly;
      an electrical assembly partially electrically connecting said first wire distribution assembly and said second wire distribution assembly, said first wire distribution assembly having a first number of electrical conductors, said electrical assembly being electrically connected to a second number of electrical conductors of said first wire distribution assembly, said second number being smaller than said first number; and
      an electrical switch being configured to electrically connect a first electrical conductor of said first wire distribution assembly that is a member of said second number of electrical conductors to a second electrical conductor of said first wire distribution assembly that is a member of said first number of electrical conductors and not a member of said second number of electrical conductors.

2. The furniture system of claim 1, wherein said first number is at least four.

3. The furniture system of claim 2, wherein said second number is at least two less than said first number.

4. The furniture system of claim 3, further comprising an other electrical switch being configured to electrically connect a third electrical conductor of said first wire distribution assembly that is a member of said second number of electrical conductors to a fourth electrical conductor of said first wire distribution assembly that is a member of said first number of electrical conductors and not a member of said second number of electrical conductors.

5. The furniture system of claim 1, wherein the electrical wiring system further includes an other electrical assembly, said plurality of wire distribution assemblies further including a third wire distribution assembly that is partially electrically connected to said first wire distribution assembly by way of said other electrical assembly, said third wire distribution assembly having a first number of electrical conductors, said other electrical assembly being electrically connected to a second number of electrical conductors of said third wire distribution assembly, said second number of electrical conductors of said third wire distribution assembly being smaller than said first number of electrical conductors of said third wire distribution assembly.

6. The furniture system of claim 5, wherein said first number of electrical conductors of said third wire distribution assembly is at least four.

7. The furniture system of claim 6, wherein said second number of electrical conductors of said third wire distribution assembly is at least two less than said first number of electrical conductors of said third wire distribution assembly.

8. The furniture system of claim 1, wherein said electrical switch is configured to determine if an area proximate to the furniture element is occupied.

9. The furniture system of claim 8, wherein said electrical switch is further configured to de-energize said second electrical conductor if it is determined that said areas has been unoccupied more than a predetermined amount of time.

10. The furniture system of claim 1, wherein said electrical switch is one of an ultrasonic switch, a thermal switch, a pressure switch, an RFID detector switch, a radio frequency receiving switch, a magnetic field detecting switch and an optical sensing switch.

11. A modular electrical wiring system for use in furniture elements of an office environment, the electrical wiring system, comprising:
   a plurality of wire distribution assemblies including a first wire distribution assembly and a second wire distribution assembly;
   an electrical assembly partially electrically connecting said first wire distribution assembly and said second wire distribution assembly, said first wire distribution assembly having a first number of electrical conductors, said electrical assembly being electrically connected to a second number of electrical conductors of said first wire distribution assembly, said second number being smaller than said first number; and an electrical switch being configured to electrically connect a first electrical conductor of said first wire distribution assembly that is a member of said second number of electrical conductors to a second electrical conductor of said first wire distribution assembly that is a member of said first number of electrical conductors and not a member of said second number of electrical conductors.

12. The modular electrical wiring system of claim 11, wherein said first number is at least four.

13. The modular electrical wiring system of claim 12, wherein said second number is at least two less than said first number.

14. The modular electrical wiring system of claim 13, further comprising an other electrical switch being configured to electrically connect a third electrical conductor of said first wire distribution assembly that is a member of said second number of electrical conductors to a fourth electrical conductor of said first wire distribution assembly that is a member of said first number of electrical conductors and not a member of said second number of electrical conductors.

15. The modular electrical wiring system of claim 11, further comprising an other electrical assembly, said plurality of wire distribution assemblies further including a third wire distribution assembly that is partially electrically connected to said first wire distribution assembly by way of said other electrical assembly, said third wire distribution assembly having a first number of electrical conductors, said other electrical assembly being electrically connected to a second number of electrical conductors of said third wire distribution assembly, said second number of electrical conductors of said third wire distribution assembly being smaller than said first number of electrical conductors of said third wire distribution assembly.

16. The modular electrical wiring system of claim 15, wherein said first number of electrical conductors of said third wire distribution assembly is at least four.

17. The modular electrical wiring system of claim 16, wherein said second number of electrical conductors of said third wire distribution assembly is at least two less than said first number of electrical conductors of said third wire distribution assembly.

18. The modular electrical wiring system of claim 11, wherein said electrical switch is configured to determine if an area proximate to the furniture element is occupied.

19. The modular electrical wiring system of claim 18, wherein said electrical switch is further configured to de-energize said second electrical conductor if it is determined that said areas has been unoccupied more than a predetermined amount of time.

20. The modular electrical wiring system of claim 11, wherein said electrical switch is one of an ultrasonic switch, a thermal switch, a pressure switch, an RFID detector switch, a radio frequency receiving switch, a magnetic field detecting switch and an optical sensing switch.

\* \* \* \* \*

UNITED STATES PATENT AND TRADEMARK OFFICE
CERTIFICATE OF CORRECTION

PATENT NO. : 8,258,412 B2  
APPLICATION NO. : 12/608716  
DATED : September 4, 2012  
INVENTOR(S) : Daniel L. Hayes et al.

Page 1 of 1

It is certified that error appears in the above-identified patent and that said Letters Patent is hereby corrected as shown below:

In the Specification

COLUMN 3
At line 54, please delete "assemblies 22, and 34.", and substitute therefore --assemblies 22, 30 and 34.--.

Signed and Sealed this
Twenty-fourth Day of September, 2013

Teresa Stanek Rea
*Deputy Director of the United States Patent and Trademark Office*